United States Patent [19]

Przybylinski et al.

[11] Patent Number: 4,771,705
[45] Date of Patent: Sep. 20, 1988

[54] SHEAR PLATE STRUCTURE FOR GONDOLA CAR

[75] Inventors: Phillip G. Przybylinski, Schererville; Donald C. Bodinger, Crown Point, both of Ind.

[73] Assignee: Pullman Standard, Inc., Chicago, Ill.

[21] Appl. No.: 904,678

[22] Filed: Sep. 8, 1986

Related U.S. Application Data

[63] Continuation of Ser. No. 596,968, Apr. 5, 1984, Pat. No. 4,633,787.

[51] Int. Cl.⁴ .................... B61F 1/08; B61D 17/10; B61D 7/00
[52] U.S. Cl. .................... 105/414; 105/406.1; 105/404
[58] Field of Search .............. 105/406 R, 355, 396, 105/404, 413, 414, 417, 418, 420, 419

[56] References Cited

U.S. PATENT DOCUMENTS

| | | | |
|---|---|---|---|
| 2,565,709 | 8/1951 | Wutter | 105/414 X |
| 2,822,897 | 2/1958 | Peterson | 105/414 X |
| 3,557,713 | 1/1971 | Spence et al. | 105/406.1 X |
| 3,557,714 | 1/1971 | Aquino | 105/247 X |
| 3,713,400 | 1/1973 | Teoli | 105/422 X |
| 4,212,252 | 7/1980 | Hart et al. | 105/248 X |
| 4,236,459 | 12/1980 | Teoli | 105/406.1 |
| 4,331,083 | 5/1982 | Landregen et al. | 105/406.1 |
| 4,589,348 | 5/1986 | Holabeck et al. | 105/406.1 X |

FOREIGN PATENT DOCUMENTS 455943 4/1949 Canada .............. 105/404

Primary Examiner—Robert B. Reeves
Assistant Examiner—Scott H. Werny
Attorney, Agent, or Firm—Myers & Ehrlich, Ltd.

[57] ABSTRACT

A gondola car for hauling bulk cargo has a stub sill for receiving longitudinal loads. A shear plate is connected with the stub sill, and longitudinal side sills and connected as by welding to side portions of the shear plate. Side walls extend upwardly from the side sills. The shear plate has an opening therein adjacent the longitudinally inward end of the weld to the side sill for reducing stress in the end of the weld. Cover structure overlies the opening, and side wall support structure is connected with the cover structure and engages the side walls to support them.

7 Claims, 5 Drawing Sheets

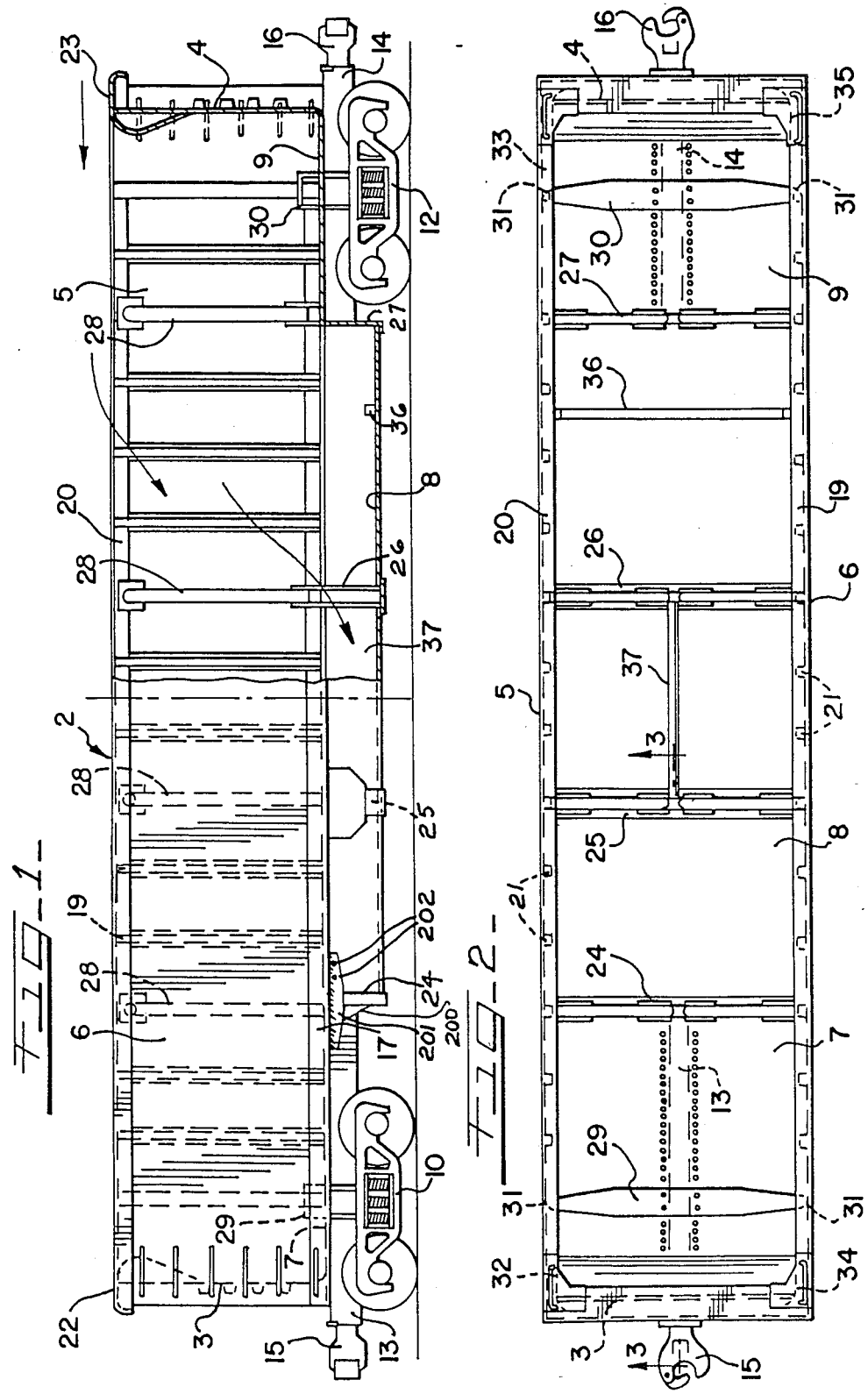

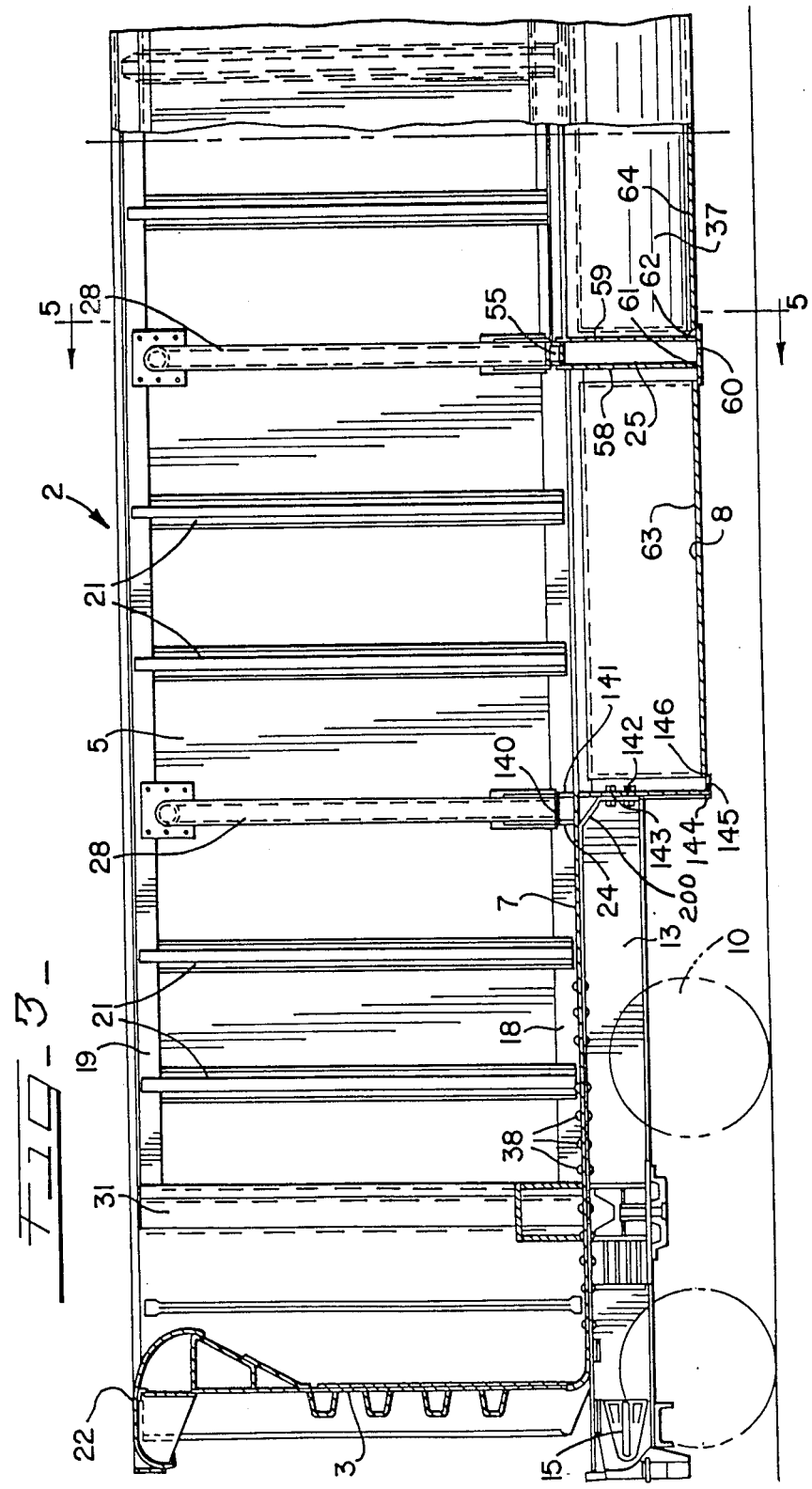

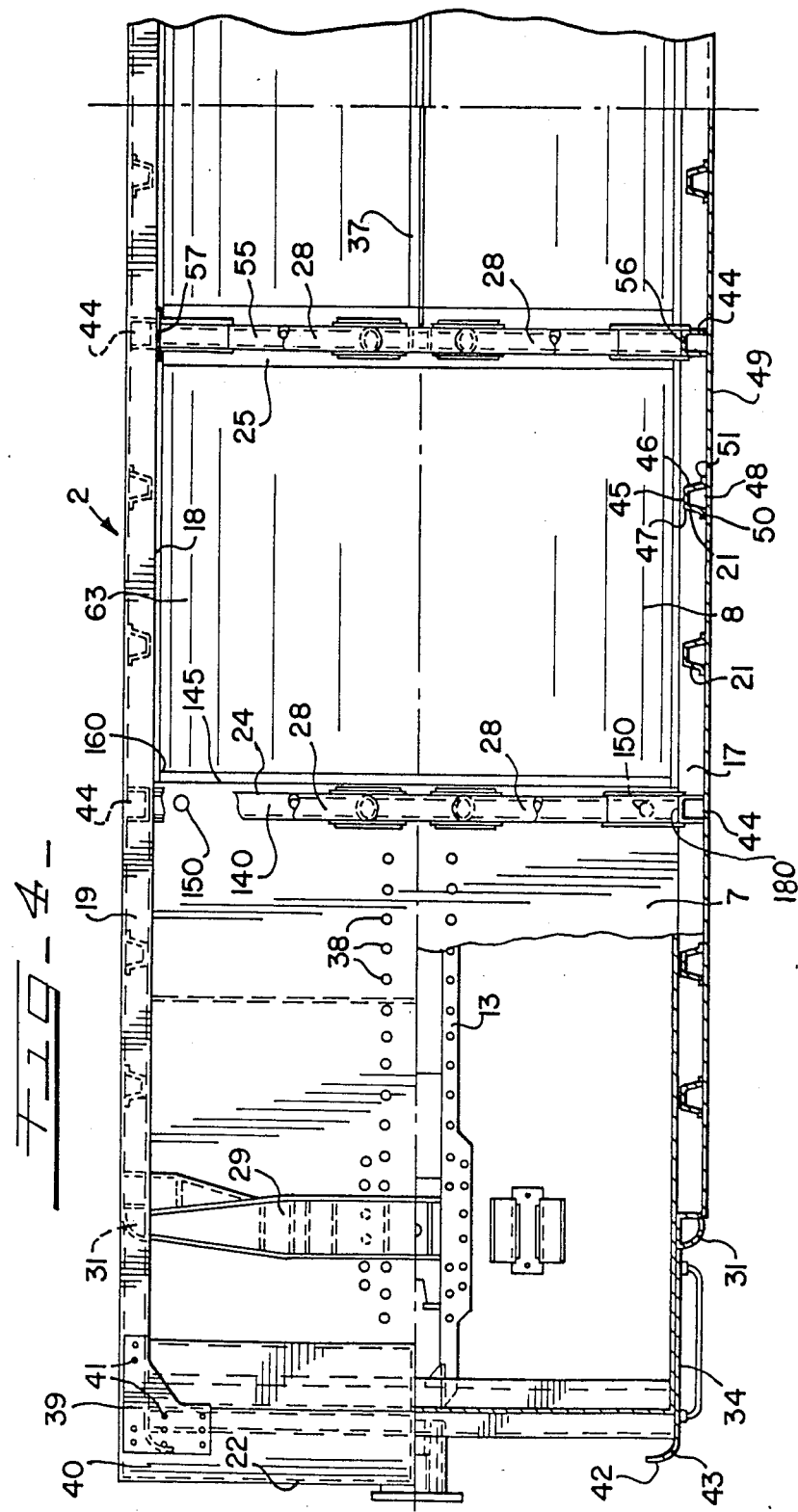

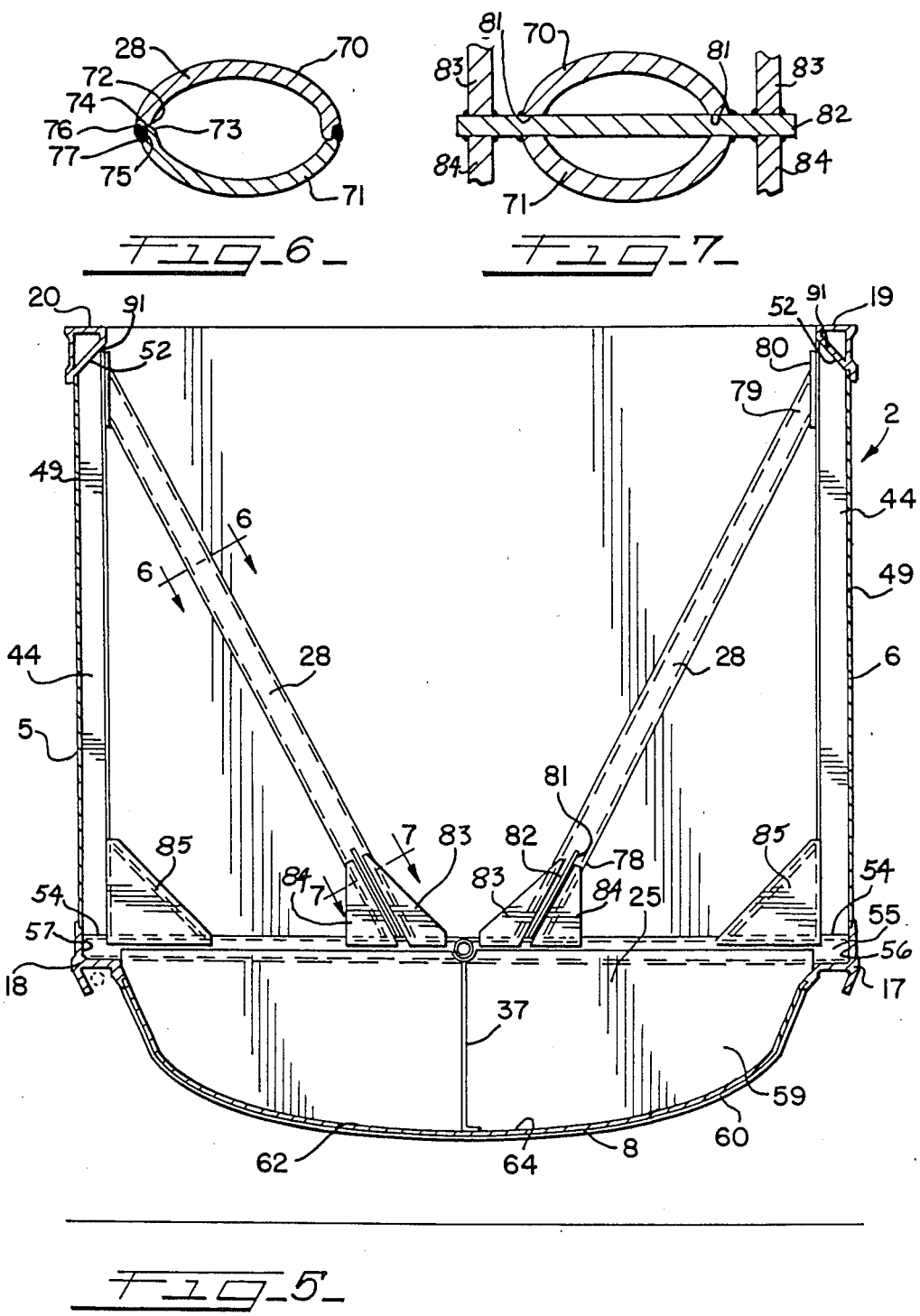

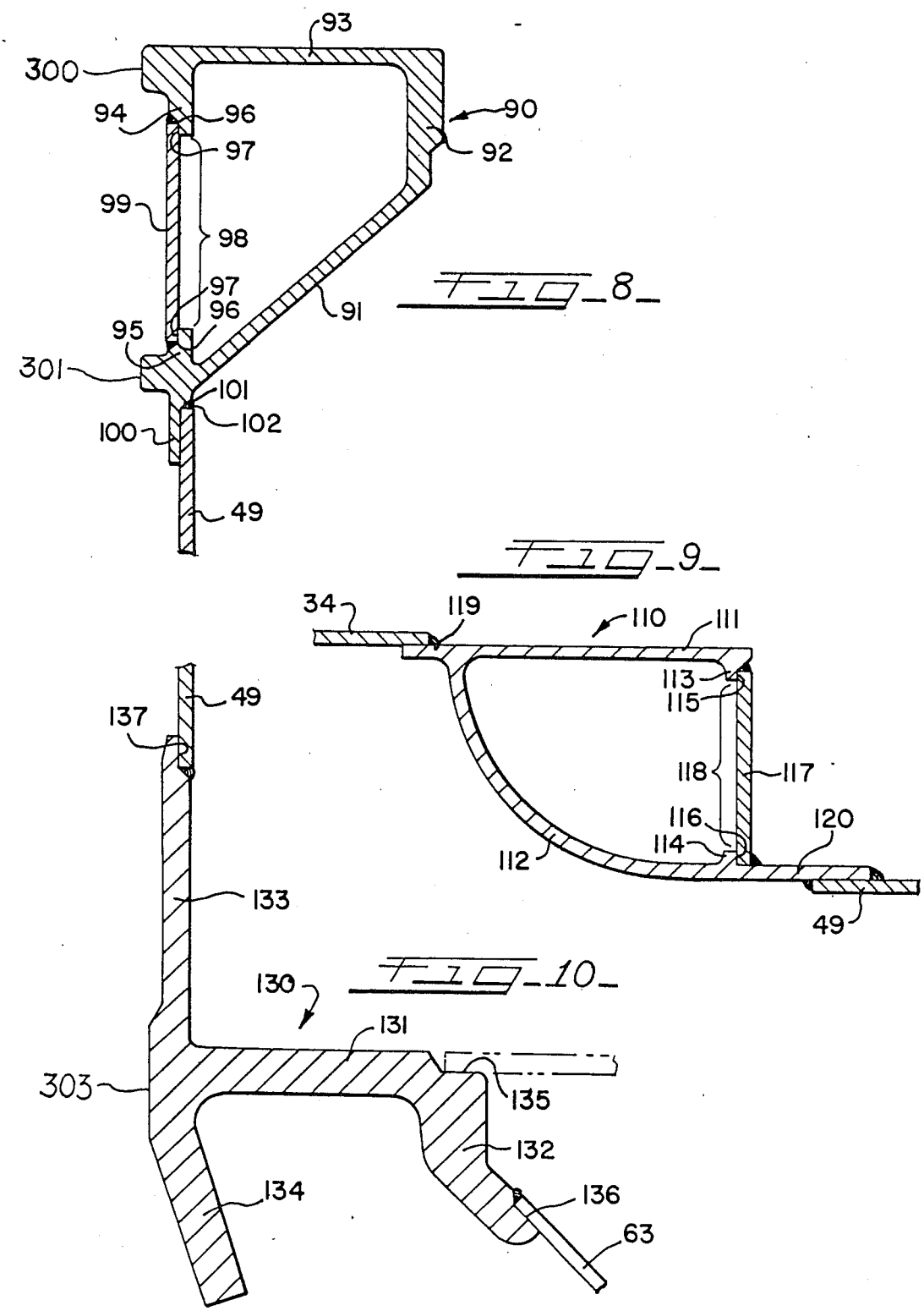

SHEAR PLATE STRUCTURE FOR GONDOLA CAR

BACKGROUND OF THE INVENTION

RELATED APPLICATIONS

This application is a continuation of U.S. patent application Ser. No. 596,968 filed Apr. 5, 1984 entitled "LIGHT WEIGHT GONDOLA TYPE RAILWAYS CAR", now U.S. Pat. No. 4,633,787, which application is related to U.S. patent application Ser. No. 583,647 filed Feb. 27, 1984, now U.S. Pat. No. 4,620,487, entitled "AERODYNAMICALLY STRUCTURED RAILWAY CAR"; U.S. patent application Ser. No. 584,016 filed Feb. 27, 1984, now U.S. Pat. No. 4,569,289, entitled "AIR FLOW GUIDE STRUCTURE FOR OPEN TOP RAILWAY CAR"; and U.S. patent application Ser. No. 597,125 filed Apr. 5, 1984, now U.S. Pat. No. 4,690,072 entitled "BOLSTER FOR RAILWAY CAR".

FIELD OF THE INVENTION

This invention relates to railway cars of the gondola type having a depressed bottom cargo carrying structure formed of a weldable aluminum alloy to make the car more energy efficient in transit in both the loaded and unloaded condition.

DESCRIPTION OF THE PRIOR ART

U.S. Pat. Nos. 3,557,714 and 3,572,252 each show previous efforts to construct a railway car using aluminum.

U.S. Pat. No. 4,024,821 shows brace construction used to rigidify a gondola type railway car.

U.S. Pat. No. 4,252,067 shows a lightweight fabricated member which serves as the top chord of a side wall of a gondola type car.

U.S. Pat. Nos. 3,713,400; 3,841,236; 4,212,252; 4,236,459; 4,254,714; 4,331,083 and 4,361,097 all show previous efforts to develop gondola type cars having lowered or depressed bottom portions for increasing the lading capacity of the car and/or for lowering the center of gravity of the car to increase its stability.

None of the above mentioned patents disclose a gondola type car having the features taught in the disclosure.

SUMMARY OF THE INVENTION

A railway car having exterior surfaces for promoting airflow has a cargo carrying structure formed of an aluminum alloy. The cargo carrying structure has skeletal support members formed of aluminum extrusions structured to weldingly receive and be rigidly engaged with aluminum alloy plates to form a lightweight, relative to steel, car having airflow promoting features.

BRIEF DESCRIPTION OF THE DRAWINGS

FIG. 1 is a partially cutaway side elevation view of an open top gondola type railway car having the structure of this invention;

FIG. 2 is a top view of the railway car shown in FIG. 1;

FIG. 3 is an enlarged side elevation view of a portion of the car shown in FIG. 1;

FIG. 4 is an enlarged top partially cutaway view of FIG. 2;

FIG. 5 is a sectional view of the car shown in FIG. 3 as indicated by the section line 5—5;

FIG. 6 is a sectional view of a diagonal support strut shown in FIG. 5, as indicated by the section line 6—6;

FIG. 7 is a sectional view of a diagonal support strut shown in FIG. 5, as indicated by the section line 7—7;

FIG. 8 is an enlarged sectional view of the top sill support member shown in FIG. 5;

FIG. 9 is an enlarged sectional view of the vertical side transition member shown in FIG. 4; and FIG. 10 is an enlarged cross sectional view of the side sill member shown in FIG. 5.

DETAILED DESCRIPTION OF THE PREFERRED EMBODIMENT

FIG. 1 shows a partially cutaway elevation view of a railway car 2 of the open top gondola type often used to haul bulk cargo, such as coal. FIG. 2 shows a top or plan view of railway car 2.

Car 2 is comprised of a cargo carrying box structure having a first end wall 3, a second end wall 4, a pair of substantially parallel, laterally spaced side walls 5 and 6 which extend between and connect to end walls 3 and 4, and a bottom closure comprised of bottom members 7, 8 and 9.

A plurality of conventional wheel truck assemblies, such as assemblies 10 and 12 are engaged with the cargo carrying structure for rollingly supporting the box and associated coupling structures, such as stub draft sills 13 and 14 and couplers 15 and 16 for connectingly engaging one or more other cars in a conventional train.

Bottom members 7 and 9 serve a dual function. They provide a bottom end closure for the cargo carrying structure and they also serve as shear plates to beam draft and buff loads from the stub center sills 13 and 14 laterally outwardly to a pair of longitudinally extending side sill members 17 and 18, best shown in cross section in FIGS. 5 and 10. Side sill members 17 and 18 serve as connective members between the bottom members and the side members. They also serve as a primary load bearing beam for lateral forces imposed on them and the adjacent bottom or side portion of the box by the lading or cargo while serving as the primary longitudinal draft and buff load carrying beams or members of the cargo carrying structure of the car.

A pair of top chord or beam members 19 and 20 are affixed to the top portion of each side 5 and 6, as best shown in FIGS. 3, 4, 5 and 8. Members 19 and 20 extend longitudinally along the car body and each is substantially parallel to, and spaced substantially vertically above, a side sill member 17 and 18, respectively.

Each of the side sill members 17 and 18 and top chord members 19 and 20 are preferably formed as a continuous extrusion of a weldable aluminum alloy.

Aluminum sheets, preferably formed of an aluminum alloy, extend between each side sill and the top chord above it and are rigidly attached to each the side sill and the top chord by appropriate means such as, preferably, welding.

A plurality of vertically extending side support members 21, as best shown in FIGS. 2, 3, 4, and 5, also preferably formed as continuous extrusions of a weldable aluminum alloy, are rigidly fixed in spaced relationship longitudinally along the side wall of the car sides and extend vertically between a side sill member and the top chord member. These side wall support members are affixed to the interior surface of each side wall plate preferably by welding and extend laterally inward into the cargo carrying space of the car structure to provide a smooth exterior surface on each side wall. This arrangement provides minimum resistance to air flow and increases the load carrying capacity of the railway car because with the side support members on the inside the spaces between the side wall support members provide additional cargo capacity when compared to a car of maximum AAR standard width with the vertical side supports on the outside of the side wall.

Car 2 has an airfoil 22 and 23 affixed to the top portion of each end 3 and 4, respectively. Bottom portion 8 is sunken or depressed below the level of floor or bottom portions 7 and 9 to increase the cargo carrying capacity of the car.

A plurality of crossridge supports, such as crossridges 24, 25, 26 and 27, are positioned on the interior of the car to provide load bearing strength to the floor portion 8 and to, in conjunction with a plurality of diagonal support means, such as diagonal support struts 28, as best shown in FIGS. 3, 4 and 5, strengthen and rigidify the side walls 5 and 6.

Car 2 is further comprised of a first fabricated bolster 29 formed above and integral with bottom or floor portion 7 and a second fabricated bolster 30 formed above and integral with bottom or floor portion 9.

As best shown in FIG. 2, a vertically extending transition means, such as bolster posts 31 are positioned at an outward or laterally outermost end of each of the bolsters 29 and 30. Each bolster post 31 serves as an aerodynamic or low air flow resistant transition member between the main sides 5 and 6 and a laterally inward offset side portion, such as side portions 32 and 33 of main side 5 or laterally inward offset side portions 34 and 35 of main side 6. Offset side portions 32, 33, 34 and 35 are placed laterally inward from main sides 5 and 6 to enable placement of ladder or step brackets on these portions without exceeding standard AAR car width requirements.

A minor or supplemental crossridge assembly 36 is affixed to bottom portion 8 intermediate crossridges 26 and 27 and a longitudinally extending support web 37 is affixed to and extends between crossridge assemblies 25 and 26.

FIG. 3 shows in an enlarged sectional view a portion of the car shown in FIGS. 1 and 2, FIG. 4 is a top partially cutaway view of FIG. 3 and FIG. 5 is a sectional view of FIG. 3.

As shown in FIGS. 3 and 4 stub center sill 13 is rigidly affixed to bottom or floor and shear plate member 7 by a plurality of mechanical fasteners, such as bolts or rivets 38 due to the stub center sill being formed of steel and plate 7 being an aluminum alloy whereby welding these two metals is impractical. The attachment of sill 14 to plate 9 is substantially identical to the attachment of plate 7 to sill 13.

Typical corner construction is shown in FIG. 4 whereby attachment means, such as gusset plate 39, is affixed to each top chord 19 and a top surface portion 40 of airfoil 22 by appropriate means, such as welding or, as shown, a plurality of mechanical fasteners, such as rivets 41.

As shown at the opposite corner the terminal end 42 of offset side portion 34 is inwardly curved to an aerodynamic, drag reducing convex curve 43 to enhance or promote smooth or non-turbulent airflow around the corner and onto the smooth side of wall 34. Each of the offset side portions 32, 33 and 35 have a substantially identical curved terminal end portion for precisely the same reason.

FIG. 5 shows engagement of diagonal struts 28 with side support members 44. A pair of struts 28 are positioned laterally in the car in alignment with each other to form a portion of crossridge assembly 25. Side support members 44 are configured differently from side support members 21 as members 21 are, as best shown in FIG. 4, aluminum extrusions having three walls, 45, 46 and 47 and an open side 48 closed by a side plate 49 formed as an integral portion of side 6. Each wall 46 and 47 diverges from wall 45 and has an integrally formed short attachment web, such as webs 50 and 51 to facilitate welding each of the members 21 to a side plate 49. The top end portion of each member 21 is appropriately coped to mate with the inner wall of a top chord member.

Members 44, on the other hand, are three walled tubular aluminum extrusions substantially rectangular in cross section to increase their strength and provide an inner facing wall surface 180 for readily engaging other components of the crossridge assemblies 24, 25, 26 or 27. Members 44, referring again to FIG. 5, have an upper terminal end 52 coped to matingly engage an angled wall portion 91 of top chord member 19 or 20 and a lower terminal end 54 which engages and is welded to a substantially rectangular laterally extending crossridge member 55 of crossridge assembly 25. Member 55 has a first end 56 rigidly affixed to side sill 17 and a second end 57 rigidly affixed to side sill 18. A pair of side plates 58 and 59, best shown in FIG. 3, are welded to member 55 and extend downwardly. A lower terminal end 61 and 62 respectively, of each of the plates 58 and 59 is formed to conform to a floor or bottom support band 60 positioned supportingly beneath and welded to the floor plates 63 and 64 comprising bottom or floor section 8, substantially as shown in FIG. 3.

As best shown in FIGS. 5, 6 and 7, a pair of diagonal support struts 28 are attached to an intermediate portion of crossridge assembly 25 and angle upwardly and outwardly to engage an upper interior portion of a side wall.

Struts 28 are, as best shown in cross section in FIG. 6, formed of two substantially mirror image semi-elliptical aluminum extrusions 70 and 71 which are placed together to form a composite strut substantially elliptical in cross section.

Each half of the composite strut is provided with location facilitating mating surfaces such as abutment shoulders 72 and 73 and lateral engaging surfaces 74 and 75 to facilitate assembly of the two halves. A weld relief is provided along each joint by surfaces such as 76 and 77 and members are welded along each side in the weld relief gap between surfaces 76 and 77, as shown.

Each strut 28 has a lower end portion 78 and an upper end portion 79. Upper end portion 79 is coped at an angle and weldably engaged with an attachment plate 80 which is affixed, such as by bolts, to an upper portion of a crossridge vertical member 44.

Adjacent lower end 78 of each strut 28 an attachment plate receiving slot 81 is formed between the two mating halves and an attachment plate 82, as shown in each FIGS. 5 and 7, is inserted into and welded in the slot. Attachment plate 82 extends laterally outwardly on each side of the strut and two attachment plates 83 and 84 are welded to a laterally extending portion of attachment plate 82. Plates 83 and 84 are welded to crossridge member 55 and thereby struts 28 serve to rigidify and support the top portion of each side wall 5 and 6.

A pair of gusset plates, such as plates 85, are preferably rigidly connected by welding to each horizontal crossridge member 55 and a vertical crossridge member 44 to further rigidify the crossridge assembly.

As shown, each strut 28 is assembled into the car body with its major axis parallel to the longitudinal axis of car 2 and with its minor axis transverse to the longitudinal axis of the car to provide a strong, durable strut which presents a minimal surface which is aerodynamically shaped to reduce the aerodynamic drag of air flowing through tne car body when the car is empty. Orienting the struts in this manner minimizes the resistance to air flow offered by the struts when the car is empty.

FIG. 8 is an enlarged typical cross sectional view of one of the continuous aluminum extrusion top chord members 19 and 20 having a closure plate 99 and side plate 49 attached. Extrusion 90 is comprised of first, second and third wall portions 91, 92 and 93, respectively. Two stub walls 94 and 95, each having a filler plate receiving shoulder 96 and an abutment shoulder 97, extend toward each other and are separated by a gap or space 98. Space 98 enables selective placement of reinforcing members (not shown) into the interior surface of the extrusion and provides access to enable such reinforcement to be welded to the interior surfaces of walls 91, 92 and 93. Closure plate 99 can then be abutted against abutment shoulders 97 on the stub walls and welded into place to complete the assembly.

A downwardly depending wall portion 100 having an upper location shoulder 101 is provided to receive an upper terminal portion of a side wall plate, such as plate 49 which is then rigidly attached to extrusion 90 by weld 102.

FIG. 9 shows an enlarged crosssectional view of one of the bolster posts 31. Each bolster post 31 is formed of a continuous aluminum extrusion 110 having a straight wall 111 and a curved wall 112. A pair of stub walls 113 and 114 having abutment shoulders 115 and 116 are provided for receivingly engaging a closure plate 117. As with the top chord extrusion 90, extrusion 110 is provided with a gap 118 between the stub walls 113 and 114 to enable selective placement of reinforcing means, such as plates (not shown), within extrusion 110 for securement, as by welding, to the interior surfaces of walls 111 and 112. Closure plate 117 may then be welded into position to complete the assembly.

A first laterally inwardly positioned longitudinally extending wall portion 119 is provided for engaging and being welded to a laterally offset side wall portion, such as offset wall 34 and a second longitudinally extending wall 120 is, provided for engagement with and being welded to the plates of a main side wall such as plate 49 of side wall 6.

As shown, curved wall 112 of extrusion 110 provided an efficient air flow surface transition between the laterally inward side walls, such as wall 34 and the main side wall, such as side wall 6, as shown, to increase the aerodynamic efficiency of the car in transit during both the loaded and unloaded condition.

FIG. 10 is an enlarged cross sectional view of the side sill members 17 and 18. Each side sill is formed of a continuous aluminum extrusion, such as extrusion 130, having a substantially horizontal body portion 131, having an integral laterally inward downward depending portion 132, an integral laterally outward upward extending portion 133 and a laterally outward downward depending portion 134.

Body portion 131 has a bottom plate abutment shoulder 135 for abuttingly receiving horizontal bottom and shear plates, such as plates 7 and 9, represented in phantom.

Downwardly depending member 132 has a bottom plate abutment shoulder 136 for abuttingly receiving a member of bottom 8, such as plate 63. The upwardly extending portion has an abutment shoulder 137 for abutingly receiving a side plate member, such as side plate 49 of side 6.

The side wall plate members 49 and/or bottom and shear plate members 7, 9 and/or plates of depressed bottom portion 8 are welded to side sill extrusions 130 to complete the assembly.

Welding tends to weaken metals in the heat affected zone of the weld. Therefore, extrusion 130 has been designed so laterally outward downward depending member 134 remains substantially unwelded in a completed gondola car. The side sill serves as a welded connective member between the bottom and side portions of the car while retaining the strength required to support cargo contained within the load carrying structure and transmitting and sustaining the substantial tensile and compressive, or draft and buff, loads imposed upon it by the stub center sills 13 and 14 acting through the shear plates 7 and 9.

Crossridge assembly 26 is substantially identical to crossridge assembly 25 as described in detail above. Also, crossridge assemblies 24 and 27 are substantially identical to each other as they each have only one web or depending plate and they are located at the transition area between bottom shear plates 7 and 9 and the depressed bottom area generally indicated at 8.

Referring to FIGS. 3 and 4, crossridge assembly 24 is comprised of a pair of vertical cross ridge members 44 with a three wall extrusion 140 extending horizontally between the lower end portions of members 44, the diagonal struts 28 which are elliptical in cross section are attached to member 140 and the upper portion of vertical side posts 44 in substantially the same way as above described in crossridge assembly 25.

Extrusion 140 is positioned open side down on the shear plate, such as plate 7, and welded into position. A downwardly depending plate 142 is welded to shear plate 7 directly beneath the vertical wall 141 of extrusion 140 which is adjacent to depressed floor section 8. A portion of plate 42 is mechanically affixed, such as with bolts, to a terminal end of a stub sill, such as end 143 of stub center sill 13. The lower end 144 of plate 142 is cut to conform to the substantially two radius curve of the depressed section bottom plates and welded to a support band 145. Support band 145 is positioned supportingly beneath depressed area floor plate 63 adjacent its terminal end 146 and the plate 63 and band 145 are welded together to form a strong transition bottom closure. Crossridge assembly 27 is substantially a mirror image of crossridge assembly 24.

As best shown in FIG. 4, from which a portion of crossridge assembly has been cutaway, an opening 150 is positioned in shear plate and bottom closure member 7 adjacent corner 160. Corner 160 is the point at which the side sill 18, plate 63 of depressed floor portion 8 and bottom support band 145 intersect. As this is a critical corner opening 150 is provided in the shear plate 7 to isolate corner 160 from draft and buff loads transmitted by the stub center sill through the shear plate 7 and into the side sill 18. Opening 150 assures that such force loadings will not be concentrated at corner 160 and it thereby serves to protect the integrity of the welds at corner 160. Force isolating opening 150 is covered by the horizontal crossridge member 140 and cargo is thereby prevented from falling through this opening. A similar opening for the same purpose is located in each corner of each shear plate 7 and 9 adjacent depressed floor section 8.

Also, at the corners 160, a box reinforcement member 200, as shown in FIG. 1, is provided to transmit loads from web or plate 142 to post 44 and a side sill member. Reinforcement member 200 is particularly desirable as web 142 is not centered on posts 44.

Additional reinforcement is provided in the area of corners 160 by an outside reinforcement plate 201 which is attached to side sill leg 132 and extends longitudinally in each direction from the terminal end of shear plate 7, as shown in FIG. 1. Preferably, appropriate means, such as a plurality of bolts 202, are used to affix member 201 to bottom closure plate 8.

As best shown in FIGS. 8, 9 and 10, the components 90, 110 and 130 are structured to provide a rigidifying, strength enhancing structural back-up for the welds.

Specifically, in FIG. 8 downwardly depending wall 100 provides support for weld 102 which connects top chord member 90 to side wall plate 49.

Also, as shown in FIG. 9, the forward end portion 119 of straight wall 111 of bolster post extrusion 110 provides an overlapping structural back-up for the weld connecting wall 34 to wall 11.

FIG. 10 shows abutment shoulders 135, 136 and 137 providing a structural reinforcement or back up for each of the components welded adjacent them Each of the above constructions aids in preventing fatigue of the respective welds as the point of flexure of the sheet is transferred from the weld area to the area where the back-up structure terminates with respect to the sheet or plate it is welded to.

As best shown in FIG. 8 top chord member 90 is provided with laterally outward extending increased thickness flange areas or protuberances 300 and 301. These areas provide abrasion resistance for the top chord members formed of extrusion 90.

Similarly, as best shown in FIG. 10, the extrusion 130 forming the side sills 17 and 18 has an increased thickness portion 303 which extends laterally outwardly beyond the laterally outward surface of side connective member 133 to provide abrasion resistance for the side sills.

What is claimed is:

1. A railway car having two opposite ends and comprising:
   a first stub center sill supported at one of the ends of the car for receiving longitudinal loads;
   a first shear plate member fixedly connected with the first stub center sill for transferring loads thereto and receiving loads therefrom;
   said shear plate member having a pair of lateral side portions;
   first and second longitudinally extending side sill members supported adjacent respective side portions of the shear plate member;
   first and second side walls each connected with a respective side sill member and extending generally upwardly therefrom;
   generally longitudinally extending fastening means fixedly connecting each of the side sill members to respective side portions of the shear plate member and transferring loads between the shear plate member and the side sill member whereby longitudinal loads on the center sill are transferred to the shear plate member and through the fastening means to the side sill members which bear the longitudinal buff and draft loads in the car; and
   each of the fastening means having a longitudinal inward end;
   said shear member having an opening therein adjacent the longitudinally inward end of one of the fastening means, said opening being located laterally inwardly of said longitudinally inward end and longitudinally outwardly of said longitudinally inward end for reducing the stress in said inward end of the fastening means;
   cover means on said shear plate member overlying said opening; and
   side wall support means connected with the cover means and engaging the side walls.

2. The invention according to claim 1 and
   first and second side walls extending upwardly from the first and second side sill members respectively and defining a cargo carrying space therebetween.

3. The invention according to claim 2 and
   said fastening means comprising weld means connecting the shear plate member to the side sill members;
   each of the side sill members being a continuous aluminum extrusion comprising:
   a generally angle-shaped portion having a generally upwardly extending portion welded to the respective side wall and a generally inwardly extending portion connected with the shear plate member by said weld means; and
   a strengthening flange portion formed integral with the angle-shaped portion and extending downwardly therefrom, said flange portion being unwelded and out to the heat effect zone of the weld means and the weld to the side wall whereby the flange portion reinforces the side sill member for bearing draft and buff loads.

4. The invention according to claim 1 and
   a reinforcement member fixedly connected to one of the side sill members adjacent the longitudinally inward end of said one of the fastening means for reinforcing the side sill member at the critical high stress corner where the side sill member and the shear plate member interect.

5. The invention according to claim 4 and
   said reinforcement member being attached to the side sill member by further fastening means.

6. The invention according to claim 1 and
   said shear plate member having a second opening adjacent the inward end of the other of the fastening means for reducing forces in the longitudinally inward end thereof.

7. The invention according to claim 1 and
   said fastening means comprising weld means.

* * * * *